United States Patent [19]

Ehmer et al.

[11] Patent Number: 5,302,010

[45] Date of Patent: Apr. 12, 1994

[54] CIRCUIT CONFIGURATION FOR IMPROVING THE DRIVING BEHAVIOR OF AN AUTOMOTIVE VEHICLE TENDING TO OVERSTEERING

[75] Inventors: Norbert Ehmer, Bad Orb; Hans-Joachim Buettner, Hohenahr/Erdar; Thomas Striegel, Liederbach, all of Fed. Rep. of Germany

[73] Assignee: Alfred Teves GmbH, Frankfurt am Main, Fed. Rep. of Germany

[21] Appl. No.: 81,836

[22] Filed: Jun. 24, 1993

Related U.S. Application Data

[63] Continuation of Ser. No. 713,193, Jun. 10, 1991, abandoned.

[30] Foreign Application Priority Data

Jun. 9, 1990 [DE] Fed. Rep. of Germany ....... 4018495

[51] Int. Cl.$^5$ ................................................ B60T 8/64
[52] U.S. Cl. ..................................... 303/111; 303/93; 303/100; 364/426.02
[58] Field of Search ................ 303/93, 94, 100, 103, 303/107, 108, 110, 111; 364/426.02

[56] References Cited

U.S. PATENT DOCUMENTS

| | | | |
|---|---|---|---|
| 4,338,667 | 7/1982 | Cook et al. | 303/109 X |
| 4,521,856 | 6/1985 | Phelps et al. | 303/94 X |
| 4,758,053 | 7/1988 | Yasuno | 303/100 X |
| 4,760,893 | 8/1988 | Sigl et al. | 343/109 X |
| 4,844,556 | 7/1989 | Fennel et al. | 303/111 X |
| 4,844,557 | 7/1989 | Giers | 303/111 |
| 4,933,856 | 6/1990 | Leiber | 303/100 X |
| 4,998,593 | 3/1991 | Karnapp et al. | 303/100 |

FOREIGN PATENT DOCUMENTS

| | | |
|---|---|---|
| 2112090 | 7/1983 | United Kingdom . |
| 2157381 | 11/1987 | United Kingdom . |
| 2208690 | 9/1991 | United Kingdom . |

*Primary Examiner*—Andres Kashnikow
*Assistant Examiner*—Lee W. Young
*Attorney, Agent, or Firm*—Robert P. Seitter; J. Gordon Lewis

[57] ABSTRACT

A circuit configuration for improving the driving behavior of an automotive vehicle tending to oversteering, which vehicle is equipped with an anti-lock control system, causes the slip and deceleration thresholds, decisive for the onset of control at the front wheel on the outside of the bend, to be raised upon the occurrence of a cornering identification signal.

3 Claims, 2 Drawing Sheets

CIRCUIT CONFIGURATION FOR IMPROVING THE DRIVING BEHAVIOR OF AN AUTOMOTIVE VEHICLE TENDING TO OVERSTEERING

This application is a continuation of application Ser. No. 07/713,193 filed Jun. 10, 1991, now abandoned.

TECHNICAL FIELD

The present invention relates to a circuit configuration for improving the driving behavior of an automotive vehicle tending to oversteering during cornering, the vehicle being equipped with an anti-lock control system responding to the transgression of slip and/or deceleration thresholds and containing cornering identification circuits.

BACKGROUND OF THE INVENTION

There are situations when anti-lock control even increases the oversteering tendency of vehicles which tend to oversteer in case of a relatively high speed and of a relatively small radius of the bend. This is particularly true under the influence of a so-called yawing moment limitation. This will be explained in more detail in the following.

SUMMARY OF THE INVENTION

It is an object of the present invention to overcome this shortcoming of high-quality electronic anti-lock control systems.

It has been found that this can be achieved by means of a circuit configuration of the type referred to above having the particular feature that the slip and/or deceleration thresholds, decisive for the onset of anti-lock control at the front wheel on the outside of the bend, can be raised by a predetermined value and for a predetermined duration upon the occurrence of a cornering identification signal.

According to a preferred embodiment of the present invention, where the circuit configuration has circuits for yawing moment limitation, the cornering identification signal causes this yawing moment limitation to be cut off.

In a more specific example of the present invention, the rise in the slip and/or deceleration thresholds fades linearly within a predetermined period of 400–2000 msec, in particular 500–800 msec.

It is well known that during cornering, the wheel on the inside of the bend is relieved because of centrifugal moments and the wheel on the outside of the bend is loaded. Thus, the wheel on the inside of the bend can be identified as such in that, apart from extremely different friction coefficients on the inside and outside of the bend, anti-lock control will start first at this wheel. Of course, it is also possible to develop a signal, indicating the fact of cornering and the direction of the bend, by means of centrifugal sensors or other means.

Thus, according to the present invention, a complete or, at least, a partial compensation of an oversteering tendency during cornering is achieved in a very simple manner without any additional components but rather from the anti-lock control system, thereby improving considerably the driving behavior of the vehicle.

Further characteristics, advantages and applications of the present invention will become evident from the following description of an embodiment of the invention with reference being made to the accompanying drawings.

DETAILED DESCRIPTION OF THE INVENTION

The example described herein is for an electronic anti-lock control system with yawing moment limitation for a vehicle tending to oversteering during cornering. As is well known, such oversteering tendencies cause dangerous situations at higher speeds and relatively narrow bends. This is illustrated by the curves in FIG. 1.

Measures or circuitry for yawing moment limitation primarily prove advantageous or even necessary in situations with different friction coefficients on the right-hand and left-hand sides of the vehicle. The rating of the respective vehicle plays an important part in this. Yawing moment limitation systems are not intended for improving the driving behavior during cornering.

Figure 1:
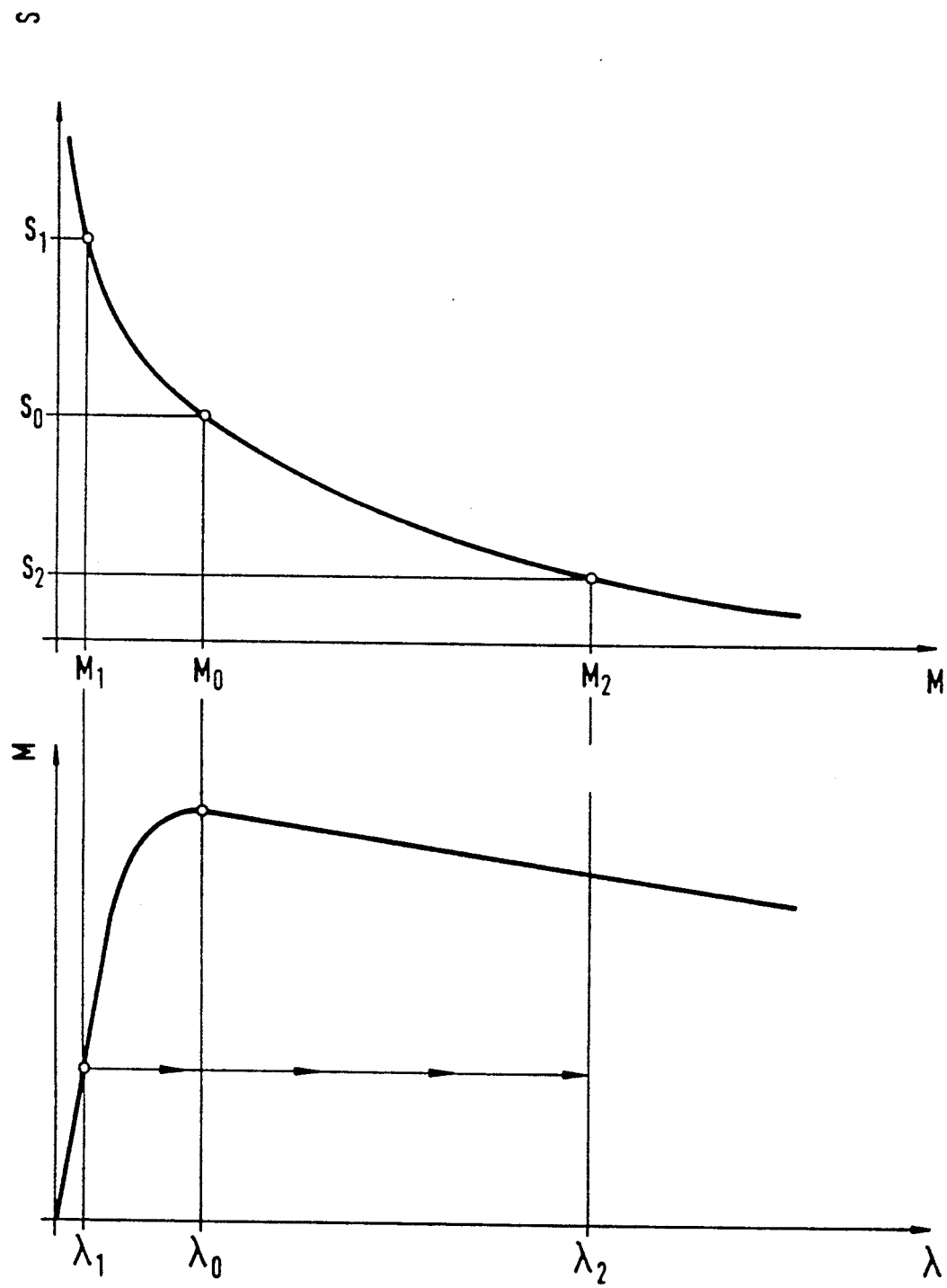
FIG. 1 shows curves representing the lateral force as a function of the braking torque and the braking torque as a function of the brake slip for the front wheel on the outside of the bend.

In this context, anti-lock control comes about relatively early at the front wheel which is on the inside of the bend and which is relieved because of cornering. Without yawing moment limitation, the braking pressure at the front wheel on the outside of the bend would increase until the stability limit of the wheel is reached. By means of yawing moment limitation, however, the increase in the braking pressure and, hence, in the braking torque is reduced at the wheel on the outside of the bend so as to ensure that, on road surfaces with different friction coefficients on the right and on the left, an excessive yawing moment, due to excessive braking force differences at the wheels on the right and left sides of the vehicle, will not form. Referring to FIG. 1, at the front wheel on the outside of the bend, there will be no brake slip $\lambda_0$, which would be valid without yawing moment limitation. Yawing moment limitation rather limits the brake slip to the value of $\lambda_1$. With regard to the lateral force, or rather lateral guiding force S, which, as is known, decreases with increasing slip—or rather with an increasing braking torque M—the value applying to the wheel under consideration which, in this case, is the front wheel on the outside of the bend is the considerably higher lateral force value $S_1$ instead of the value $S_0$. It has been found that this increase in the lateral force to the value of $S_1$, in conjunction with the centrifugal force, considerably increases the oversteering tendency. Now, according to the present invention, however, the braking torque is raised to the value of $M_2$ and the lateral force is reduced to $S_2$ by switching off yawing moment limitation and by raising the slip thresholds for the front wheel on the outside of the bend to the value of $\lambda_2$. A rise in the deceleration thresholds determining the onset of control will have the same effect.

The oversteering tendency of the automotive vehicle is reduced by means of the inventive shifting of the control thresholds at the front wheel on the outside of the bend after terminating yawing moment limitation upon cornering identification and the rise in the braking torque on this wheel which is implied thereby.

Upon identifying the criteria, i.e., cornering and cut-off of yawing moment limitation, caused thereby, it is expedient to raise the slip and/or deceleration thresholds by a certain amount and to let this rise fade linearly within a period such as of 500-700 msec. Thus, the oversteering tendency is practically transferred into a temporary understeering depending on the wheel behavior whereby, on balance, there results an almost neutral driving behavior.

Figure 2:
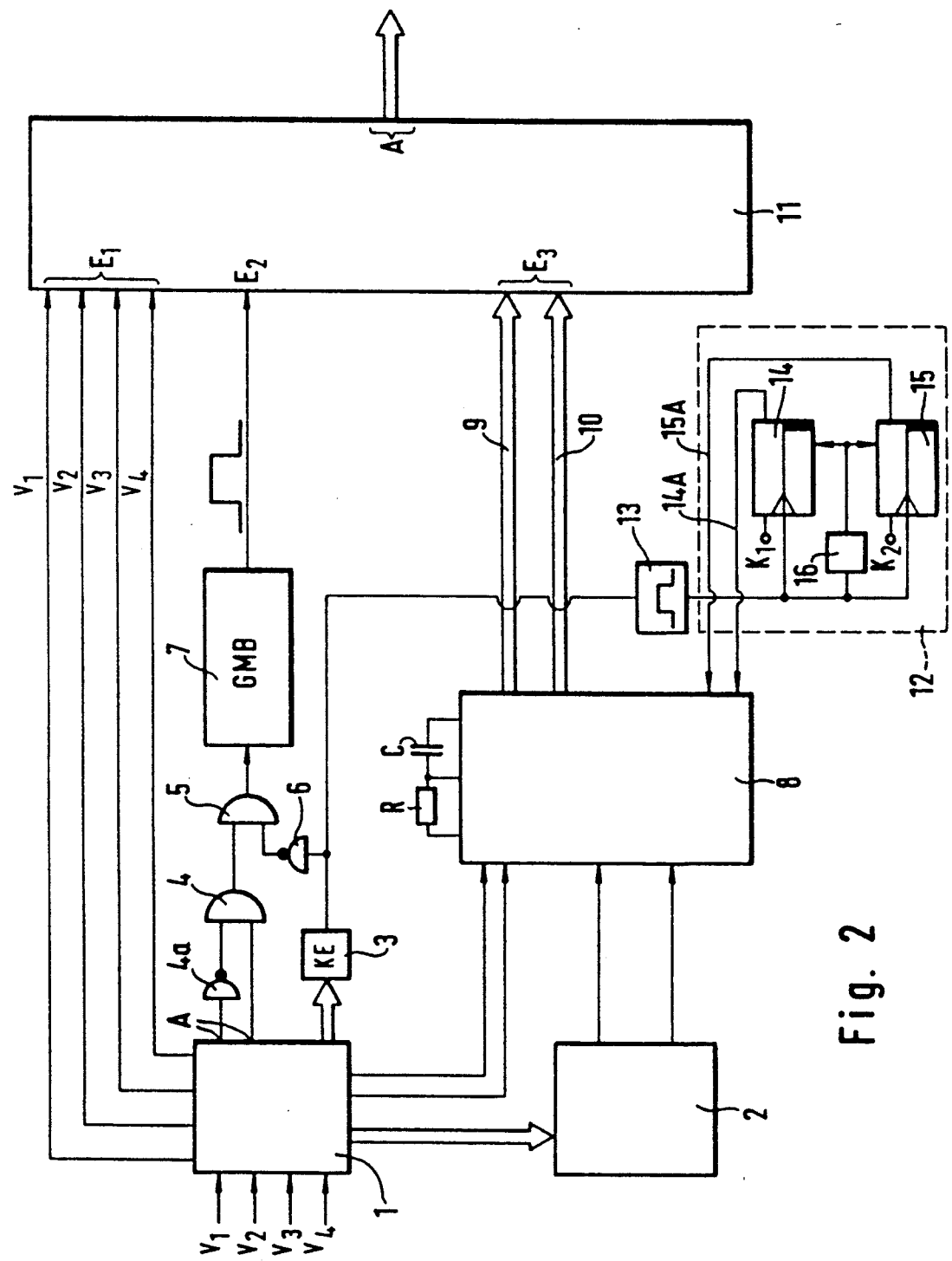
FIG. 2 is a block diagram of a circuit configuration according to the present invention.

FIG. 2 shows the main functional groups of a circuit configuration according to the present invention. At first, the signals $V_1$ through $V_4$, gained by means of wheel sensors in a known manner and representing the rotational behavior of the individual vehicle wheels, are processed and logically linked in a circuit block or functional block 1. In a stage 2, control thresholds, i.e., slip thresholds as well as deceleration/acceleration thresholds, are derived by means of a comparison with a vehicular reference velocity (not illustrated). Cornering identification is performed in a circuit 3. Whether the front wheels are running stable or whether anti-lock control is taking place is signalled at the outputs A of functional block 1. An AND-gate 4, in conjunction with a NOT-element 4a, indicates when one of the front wheels is running stable and anti-lock control has come about at the other one and emits an output signal in such a case. A yawing moment limitation circuit 7 is actuated via another AND-gate 5 to which the output of the cornering identification circuit 3 is also connected via a NOT-element 6. Consequently, after cornering identification, yawing moment limitation 7 will be cut off even if one of the front wheels is running stable and control has set in at the other one.

Finally, upon cornering identification, the slip and/or deceleration thresholds are raised by means of the flipflops 12, essential in the present invention, in a time function element 8 which, inter alia, receives signals representing the slip and acceleration thresholds computed in stage 2 and which, directly from functional block 1, receives information on the rotational behavior of the front wheels. Cornering being identified, this causes a pulse in each control operation via a stage 13, two edge controlled flip-flops 14, 15 responding to the pulse. A so-called "threshold offset", namely a predetermined value $K_1$, and an "acceleration offset", namely a constant value $K_2$, are transmitted to the time function element or integrator 8 via the output lines 14A and 15A. In this way, the thresholds are shifted by the predetermined values $K_1$, $K_2$. The flip-flops 14, 15 are reset into their initial positions after a predetermined period by a lag element 16.

By way of output signal lines 9, 10, the time function element 8 passes information on the slip and deceleration thresholds, changed in accordance with the present invention, to a control logic 11 where signals for braking pressure control, i.e., for actuating the braking pressure control valves, are developed in the usual manner from all signals supplied via the inputs $E_1$, $E_2$ and $E_3$, above all from the wheel sensor signals $v_1$-$v_4$ ($E_1$), from the output signal of the yawing moment limitation circuit 7 ($E_2$) and from the threshold value signals transmitted via the lines 9, 10 ($E_3$). The valve control signals are available at the output A of the logic 11.

An RC module connected to the time function element 8 symbolizes the dependence in terms of time of the rise in the slip and deceleration thresholds. Preferably, the rise in these threshold values fades linearly within a certain period which, for instance, may be 700 msec.

What is claimed:

1. Apparatus for improving the driving behavior of an automotive vehicle tending to oversteering, said automotive vehicle having an outer front wheel during cornering, an inner front wheel during cornering, rear wheels, means for developing wheel signals representative of the rotational behavior of said front wheels, and anti-lock control system, and a yaw moment limitation circuit, said apparatus comprising:

means responsive to said wheel signals for developing:
  (a) from said wheel signals cornering identification signals representative of said automotive vehicle undergoing cornering maneuvers,
  (b) at least one slip threshold signals and deceleration threshold signals representative of a slip threshold and a deceleration threshold of the outer front wheel during cornering, respectively, and
  (c) anti-lock signals representative of anti-lock control applied to one of said front wheels;

means responsive to said cornering identification signals and said anti-lock signals for disabling said yaw moment limitation circuit when said automotive vehicle undergoes cornering maneuvers;

and means responsive to said wheel signals and said cornering identification signals for modifying at least one of said slip threshold signals and said deceleration threshold signals to raise said slip threshold and said deceleration threshold, respectively, by a predetermined amount for a predetermined duration upon the occurrence of said automotive vehicle undergoing a cornering maneuver.

2. Apparatus according to claim 1 wherein the rise in said at least one of said slip threshold and said deceleration threshold fades linearly within a predetermined period of 400-2000 msec.

3. Apparatus according to claim 2 wherein said predetermined period is 500-800 msec.

* * * * *

UNITED STATES PATENT AND TRADEMARK OFFICE
CERTIFICATE OF CORRECTION

PATENT NO. : 5,302,010
DATED : April 12, 1994
INVENTOR(S) : Norbert Ehmer, et al.

It is certified that error appears in the above-indentified patent and that said Letters Patent is hereby corrected as shown below:

In Claim 1, column 4, line 28, insert the word "of" between --one-- and --slip--

Signed and Sealed this

First Day of November, 1994

*Attest:*

*Attesting Officer*

BRUCE LEHMAN

*Commissioner of Patents and Trademarks*